United States Patent
Sterzik

[15] 3,691,683
[45] Sept. 19, 1972

[54] METHOD FOR THE CHEMICAL TREATMENT OF LIVING TREES AND INJECTION CARTRIDGE FOR THE PERFORMANCE OF THE AFORESAID METHOD

[72] Inventor: Harry Klaus Sterzik, Am Enterbusch 25, Hannover, Munden, Germany

[22] Filed: May 14, 1970

[21] Appl. No.: 37,161

[30] Foreign Application Priority Data

May 16, 1969 Germany..........P 19 25 454.7

[52] U.S. Cl. .......................47/57.5, 128/272, 21/73
[51] Int. Cl. ..............................................A01g 7/06
[58] Field of Search............47/57.5; 21/73; 128/272

[56] References Cited

UNITED STATES PATENTS

| | | | |
|---|---|---|---|
| 1,999,458 | 4/1935 | Hollister | 47/57.5 |
| 2,993,245 | 7/1961 | Reece | 21/73 |
| 3,069,809 | 12/1962 | Simmons | 47/57.5 |
| 3,367,065 | 2/1968 | Cravens | 47/57.5 |

FOREIGN PATENTS OR APPLICATIONS

| | | | |
|---|---|---|---|
| 339,099 | 4/1936 | Italy | 111/6 |
| 786,083 | 11/1957 | Great Britain | 47/57.5 |

*Primary Examiner*—Robert E. Bagwill
*Attorney*—Werner W. Kleeman

[57] ABSTRACT

A method for the chemical treatment of living trees is disclosed wherein a chemical agent is injected into the tree in that a cartridge which is at least partially filled with the chemical treating agent is knocked into the tree trunk. The cartridge is ruptured at its end penetrating into the tree by virtue of the impact and there is generated within the cartridge an overpressure which injects the chemical treating agent into the trunk of the tree.

There is also disclosed an injection cartridge for carrying out the aforedescribed method which comprises a sleeve member which at least partially contains or is filled with the chemical treating agent, and wherein the end of the sleeve member destined to be knocked into the tree trunk supports a closure member which is destructible under the impact force.

1 Claim, 6 Drawing Figures

PATENTED SEP 19 1972    3,691,683

INVENTOR

HARRY KLAUS STERZIK

BY Werner H. Kleeman

ATTORNEY

METHOD FOR THE CHEMICAL TREATMENT OF LIVING TREES AND INJECTION CARTRIDGE FOR THE PERFORMANCE OF THE AFORESAID METHOD

BACKGROUND OF THE INVENTION

The present invention relates to a new and improved method for the chemical treatment of living trees and also pertains to a new and improved injection cartridge suitable for the performance of the aforesaid inventive method.

In forestry so-called rectification or forest management operations are absolutely necessary, to which belong all protective or nursing measures when the trees are at the nursery- and young timber age. The previously conventional mechanical techniques such as thinning, topping, girdling, pruning, and so forth, require a relatively large amount of time and expense. Furthermore, the use of chemical agents, for instance arborcides, in place of the mechanical treatment, is known for years. Upon completion of the treatment living trees, to which there has been applied a certain quantity of a suitable chemical agent, die after a few days.

Within the framework of the so-called chemical rectification, the trees which are to be treated have applied thereto a suitable chemical agent by means of external or internal trunk treatment. In the case of external treatment a liquid agent is applied to the surface of the trunk by means of a brush, plastic sponge, tong brush or the like. On the other hand, in the case of the internal treatment of the tree, a pasty-like or liquid agent is applied with the aid of an injection, can or the like, in such a way that this treatment agent is introduced into prebored holes or into notches cut by means of an axe.

Yet, these known techniques are exceedingly cumbersome, time-consuming, dirty and unhygienic. Additionally, the workers automatically come into contact with the chemical treating agents which are not safe, both during the preparatory work as well as during the forest rectification work.

SUMMARY OF THE INVENTION

Thus, there is a real need in the forestry art for a method which not only simplifies, accelerates and facilitates the rectification work, rather also dispenses with the direct contact of the user with the chemical agents and ensures for a controllable dosing of such chemical agent.

Hence, a primary object of the present invention relates to an improved method for the chemical treatment of living trees which replaces the previously employed rectification technique by a universally applicable, more rapid method, ensures for a faultless success in the chemical treatment process and the rectification work and reduces the time and expense previously required for rectification as well as simplifying the actual rectification work itself.

Another significant object of the present invention relates to an improved injection cartridge useful for the chemical treatment of living trees.

Still a further important object of the present invention relates to an improved injection cartridge for the chemical treatment of living trees which allows the chemical treating agent to be applied to the tree without the danger of contact with a human being, enables a dosed quantity to be applied, and wherein the application work can be carried out simply, quickly, economically, and without requiring a great deal of complicated procedural steps.

Now, in order to implement these and still further objects of the invention, which will become more readily apparent as the description proceeds, the inventive method is manifested by the features that a chemical agent is injected into the tree in that a cartridge which is at least partially filled with the chemical treating agent is knocked into the tree trunk, the end of the cartridge penetrating into the trunk destructing under the impact and there being generated an overpressure in the cartridge for injecting the chemical treating agent into the tree trunk.

The knocking of the injection cartridge into the tree trunk can be carried out in a very simple manner with the dull edge of a hachet or axe or some other tool which preferably possesses a bore for receiving a portion of the cartridge, or knocking of the cartridge into the trunk can be undertaken by means of a suitable striker or firing bolt device or equivalent structure.

The injection cartridge of the invention employed for carrying out the aforementioned inventive method comprises a sleeve member at least partially filled or containing a chemical agent, this sleeve member carrying a closure member at an end thereof destined to be knocked into the tree trunk and which closure member is destructible through the action of the impact forces.

BRIEF DESCRIPTION OF THE DRAWING

The invention will be better understood and objects other than those set forth above, will become apparent, when consideration is given to the following detailed description thereof. Such description makes reference to the annexed drawing wherein.

DETAILED DESCRIPTION OF THE PREFERRED EMBODIMENTS

Figure 1:
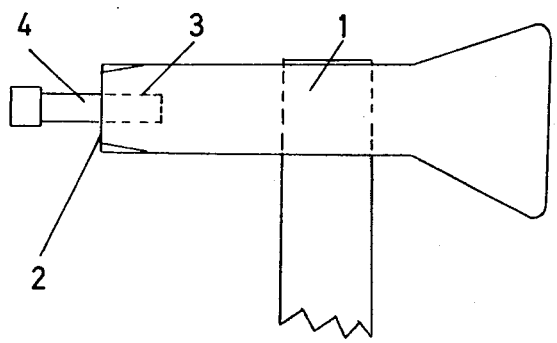
FIG. 1 schematically illustrates an impact tool with the injection cartridge mounted therein and useful for knocking such injection cartridge into the trunk of the tree being treated.

Describing now the drawings, in FIG. 1 there is schematically illustrated an impact tool 1, in principle a hammer-axe, the dull or blunt end 2 of which is provided with a suitable bore 3 for receiving an injection cartridge 4 of a type useful for carrying out the inventive method. Two different embodiments of injection cartridge designed according to the teachings of the present invention and useful for the chemical treatment of living trees have been shown in FIGS. 2a and 2b, respectively.

Figure 2:
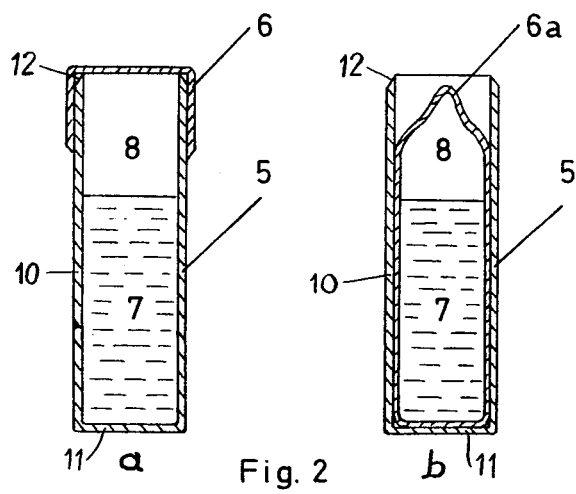
FIG. 2a is a schematic cross-sectional view of a first embodiment of inventive injection cartridge.
FIG. 2b is a schematic cross-sectional view of a second embodiment of inventive injection cartridge.

Now by specifically referring to the various forms of injection cartridge of FIGS. 2a and 2b, it will be recognized that each such cartridge consists of a sleeve member 5 having a thin-walled jacket 10 including a bottom 11, which at its open end can be inwardly pointed or tapered to one side, as shown by reference character 12. Furthermore, in the embodiment of inventive injection cartridge shown in FIG. 2a, the sleeve member 5 is provided with a closure cap 6 of the frangible type, or according to the embodiment of FIG. 2b is provided with an ampoule 6a which in effect forms a frangible closure member. Furthermore, in each instance the sleeve member 5 contains a suitable chemical treating agent, typically a liquid chemical agent 7, wherein in the arrangement of FIG. 2a the treating agent 7 is directly housed in the sleeve member 5 and in the arrangement of FIG. 2b such treating agent 7 is filled into the ampoule 6a. Moreover, in each instance up to about two-thirds of the spatial or internal volume of the cartridge, that is the sleeve member 5 of FIG. 2a and the ampoule 6a of FIG. 2b is filled with the chemical treating agent whereas the remaining approximately one-third of such volume remains filled with air as an air cushion 8.

Figure 3:
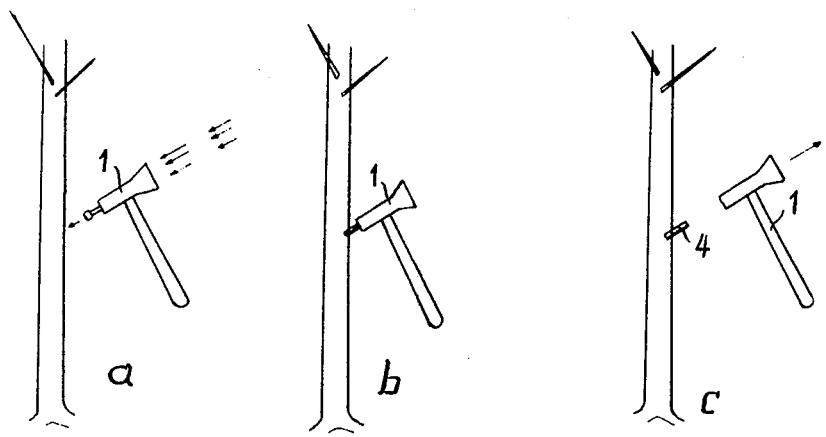
FIGS. 3a, 3b and 3c schematically illustrate the different operations occurring during knocking-in of an injection cartridge of the type shown in FIGS. 2a or 2b into the living tree which is to be treated.

FIG. 3 schematically depicts the procedural steps which take place when knocking in one of the aforementioned types of injection cartridges into a living tree. After the injection cartridge 4 has been suitably housed in the bore 3 of the axe 1 the latter is struck in the direction of the tree, as shown in FIG. 3a prior to impact. FIG. 3b depicts the impact tool or axe 1 together with the cartridge as the latter is knocked into tree, and FIG. 3c shows the completed knocking in or impact operation, wherein then the injection cartridge 4 together with its contents remains at the trunk of the tree.

The advantages which can be attained by virtue of the previously described method for the chemical treatment of living trees particularly reside in the fact that by using the injection cartridge there is obtained a desired dosing of a predetermined quantity of chemical agent required for the chemical rectification or treatment. Furthermore, no waste of chemical treating agent can occur, the treating technique is simple to carry out by knocking in the cartridge into the tree as well as providing for great efficiency in the number and surfaces of the trees to be treated. Apart from the foregoing, further advantages are realized in the reduced effort which is required for treatment in contrast to the prior art known techniques as well as the considerable saving in time and cost. Additionally, this technique, if the cartridge is filled with a suitable insecticide, is applicable in similar fashion also for combating against damage to living trees, especially against bark breeders (bark-boring beetles) and other insects.

While there is shown and described present preferred embodiments of the invention, it is to be distinctly understood that the invention is not limited thereto but may be otherwise variously embodied and practiced within the scope of the following claims.

What is claimed is:

1. An injection assembly to be driven into a tree for treatment of living trees through the injection of a chemical treating agent contained therein comprising the combination of:

a tube having a closed end and an open end, wherein the edge of said tube at said open end is sharpened for easy entrance into the tree;

a chemical treating agent partially filling said tube;

closure means for maintaining said chemical treating agent within said tube, said closure means being destructible on contact with the tree;

means for driving said open end of said tube into the tree and expelling the chemical agent into the tree, wherein said means for driving includes a member movable in the direction of the tree, and a bore located in said member on the side of said member facing the tree, said bore having a length less than the length of said tube and carrying said tube therein with said open end protruding from said bore;

wherein said closure means comprises an ampoule located within said tube and containing said chemical treating agent.

* * * * *